(12) United States Patent
Haibara

(10) Patent No.: US 8,256,672 B2
(45) Date of Patent: Sep. 4, 2012

(54) SELF-CHECKOUT TERMINAL AND CONTROL METHOD THEREFORE

(75) Inventor: Takuzo Haibara, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/006,666

(22) Filed: Jan. 14, 2011

(65) Prior Publication Data

US 2011/0210168 A1 Sep. 1, 2011

(30) Foreign Application Priority Data

Feb. 26, 2010 (JP) ................................. 2010-043029

(51) Int. Cl.
*G06K 15/00* (2006.01)
(52) U.S. Cl. ....... 235/383; 235/375; 705/16; 705/26.81; 705/26.82
(58) Field of Classification Search .................. 235/375, 235/376, 383, 385; 705/16, 26.1, 26.25, 705/26.41, 26.81–26.82
See application file for complete search history.

(56) References Cited

U.S. PATENT DOCUMENTS

| | | | | |
|---|---|---|---|---|
| 6,354,498 B1 * | 3/2002 | Lutz | .............................. | 235/385 |
| 6,431,444 B1 * | 8/2002 | Gatto | ............................. | 235/380 |
| 6,497,362 B2 * | 12/2002 | Persky et al. | .................. | 235/383 |
| 6,522,772 B1 * | 2/2003 | Morrison et al. | ............. | 382/124 |
| 6,550,672 B1 * | 4/2003 | Tracy et al. | ................... | 235/383 |
| 6,571,218 B1 * | 5/2003 | Sadler | ............................. | 705/16 |
| 6,598,791 B2 * | 7/2003 | Bellis, Jr. et al. | ............. | 235/383 |
| 2002/0170782 A1 * | 11/2002 | Millikan | .......................... | 186/61 |
| 2004/0133477 A1 * | 7/2004 | Morris et al. | ................... | 705/21 |
| 2005/0283402 A1 * | 12/2005 | Mason | ............................ | 705/16 |

FOREIGN PATENT DOCUMENTS

| | | |
|---|---|---|
| JP | 2003-051067 | 2/2003 |
| JP | 2009020667 | 1/2009 |

OTHER PUBLICATIONS

Japanese Office Action for Japanese Application No. 2010-043029 mailed on Feb. 7, 2012.

* cited by examiner

*Primary Examiner* — Tuyen K Vo
(74) *Attorney, Agent, or Firm* — Turocy & Watson, LLP

(57) ABSTRACT

According to one embodiment, a self-checkout terminal includes a reading unit, a registration processing unit, a determining unit, a checking unit, and a settlement processing unit. The reading unit reads a data code. The registration processing unit acquires sales limitation information. The determining unit determines, according to the limitation information, whether the commodity is subjected to sales limitation. The checking unit transmits, when it is determined that the commodity is subjected to the sales limitation, data for checking whether a limit condition is satisfied and determines whether data of completion of the check is returned. The settlement processing unit inhibits shift to settlement processing for the commodity subjected to the sales limitation and enables, when the checking unit determines that the data of the completion of the check is received, the shift to the settlement processing for the commodity and subjects the commodity to the settlement processing.

9 Claims, 7 Drawing Sheets

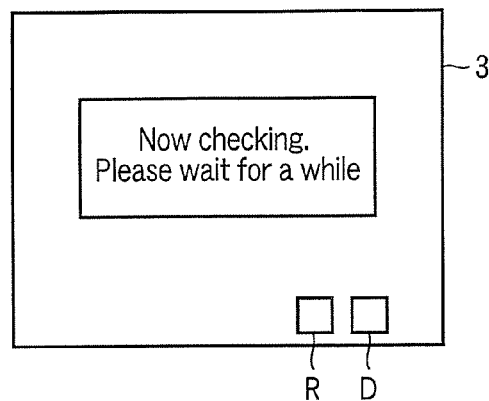
F I G. 4
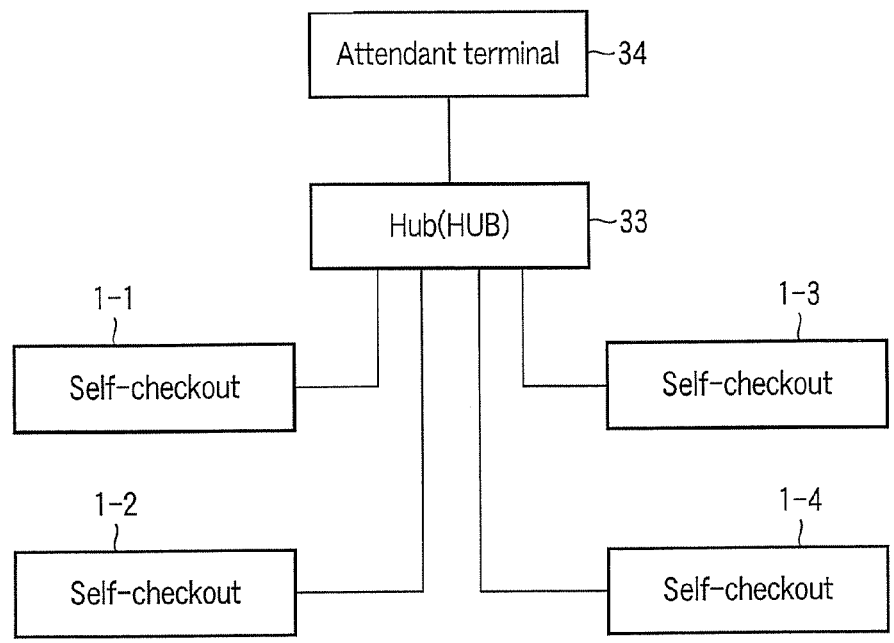
F I G. 5

SELF-CHECKOUT TERMINAL AND CONTROL METHOD THEREFORE

CROSS-REFERENCE TO RELATED APPLICATIONS

This application is based upon and claims the benefit of priority from Japanese Patent Application No. 2010-043029, filed on Feb. 26, 2010; the entire contents of which are incorporated herein by reference.

FIELD

Embodiments described herein relate generally to a self-checkout terminal that performs registration and settlement processing for a commodity having an age limit condition for permitting purchase according to, for example, the age of a customer visiting a store and a control method for the self-checkout terminal.

BACKGROUND

With a self-checkout terminal, a customer visiting a store performs registration processing for commodities that the customer is about to buy and settlement processing such as payment of a price on a self-service basis without the intervention of a store clerk. In the registration and settlement processing in the self-checkout terminal, the self-checkout terminal handles, in addition to normal commodities, commodities having age limit conditions (hereinafter referred to as limited commodities), which the customer cannot buy unless the customer reaches an age set in every country, such as alcohol beverages and cigarettes. For example, when the customer is about to purchase a limited commodity, for example, an attendant checks the age of the customer and, if the customer is at an age allowed to purchase the commodity as a result of the check, the self-checkout terminal performs registration processing for the limited commodity. If the customer is at an age not allowed to purchase the commodity, the self-checkout terminal cancels registration of the limited commodity.

In such a self check-out terminal, when a customer purchases a limited commodity, for example, the attendant checks the age of the customer. Therefore, the registration processing for the commodity can be carried forward only after the check.

As a related art of the self-checkout terminal of this type, for example, there is known a technique for determining whether a commodity is an age limited commodity for which an age condition for permitting sales is set and, when it is determined that the commodity is the age limited commodity, stopping commodity sales data processing being executed.

In the self-checkout terminal in the past, when the age of a customer about to purchase a limited commodity is checked, if the attendant is absent, the age of the customer cannot be checked and the registration processing for the commodity cannot be carried forward. Therefore, the customer is kept waiting and annoyed.

Under such circumstances, it is necessary to take measures for enabling smooth progress of registration processing when a customer purchases an age limited commodity and reducing time in which the customer is kept waiting.

DESCRIPTION OF THE DRAWINGS

FIG. 4 is a diagram of an example of a confirmation message displayed on a display of the self-checkout terminal according to the first embodiment;

FIG. 5 is a diagram of a connection relation between an attendant terminal and a plurality of the self-checkout terminals according to the first embodiment operated in a store;

DETAILED DESCRIPTION

In general, according to one embodiment, a self-checkout terminal includes a reading unit, a registration processing unit, a limitation determining unit, a limitation checking unit, and a settlement processing unit. The reading unit reads a data code attached to a commodity. The registration processing unit acquires, on the basis of the data code read by the reading unit, at least price information and sales limitation information of the commodity attached with the data code. The limitation determining unit determines, according to the sales limitation information acquired by the registration processing unit, whether the commodity is subjected to sales limitation. The limitation checking unit transmits, when the limitation determining unit determines that the commodity is subjected to the sales limitation, data for urging a check concerning whether a condition for the sales limitation is satisfied to an outside and determines whether data of completion of the check is returned from the outside. The settlement processing unit inhibits shift to settlement processing for the commodity according to the determination by the limitation determining unit that the commodity is subjected to the sales limitation and enables, when the limitation checking unit determines that the data of the completion of the check is received from the outside, the shift to the settlement processing for the commodity and executes the settlement processing on the basis of the price information of the commodity.

First and second embodiments are explained below with reference to the drawings.

First Embodiment

Figure 1:
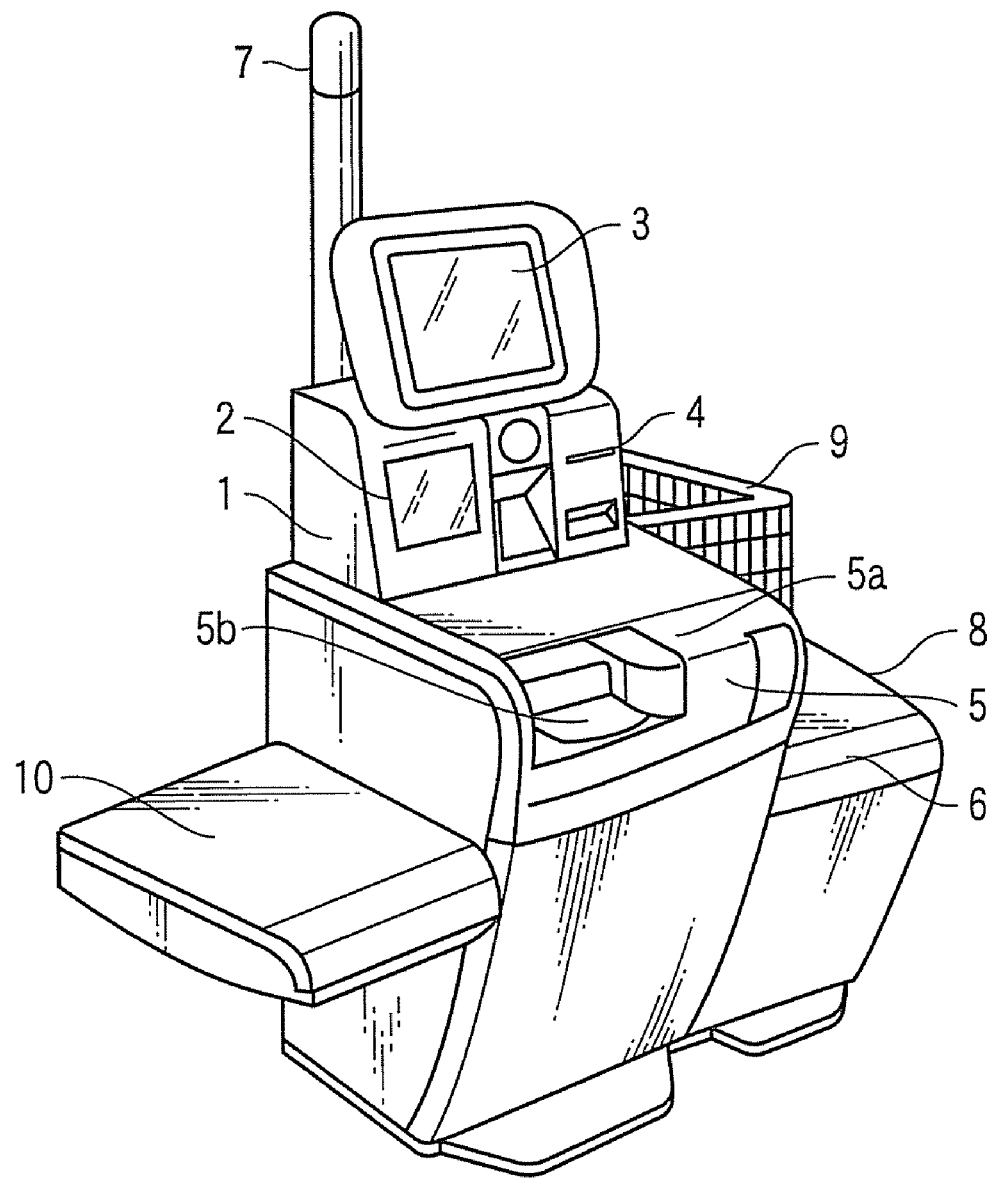
FIG. 1 is an external view of a self-checkout terminal according to a first embodiment.

FIG. 1 is an external view of a self-checkout terminal according to a first embodiment. This self-check terminal 1 includes a scanner unit 2 (a reading unit), a display 3, a receipt printer 4, a change dispensing machine 5, a weighing scale 6, and a Patlite (registered trademark) 7. The scanner unit 2 reads a data code, for example, a barcode attached to a commodity. The display 3 displays commodity names, unit prices, numbers, a total amount, a change amount, and the like of commodities during registration and settlement processing for the commodities. A touch panel is provided on a display screen of the display 3. The receipt printer 4 prints out the commodity names, the unit prices, the numbers, the total amount, the change amount, and the like on a receipt sheet. The change dispensing machine 5 dispenses change during settlement processing. The change dispensing machine 5 includes a coin input port 5a and a change take-out port 5b. The weighing scale 6 is provided on a packing table 8. When a shopping basket 9 or the like containing commodities is placed on the packing table 8, the weighing scale 6 detects, according to the weight of the shopping basket 9 or the like, that the shopping basket 9 or the like is placed. The Patlite 7 is turned on to inform that the terminal 1 is performing registration and settlement processing for commodities. The packing table 8 is provided on one side of a terminal main body. A basket placing table 10 is provided on the other side.

Figure 2:
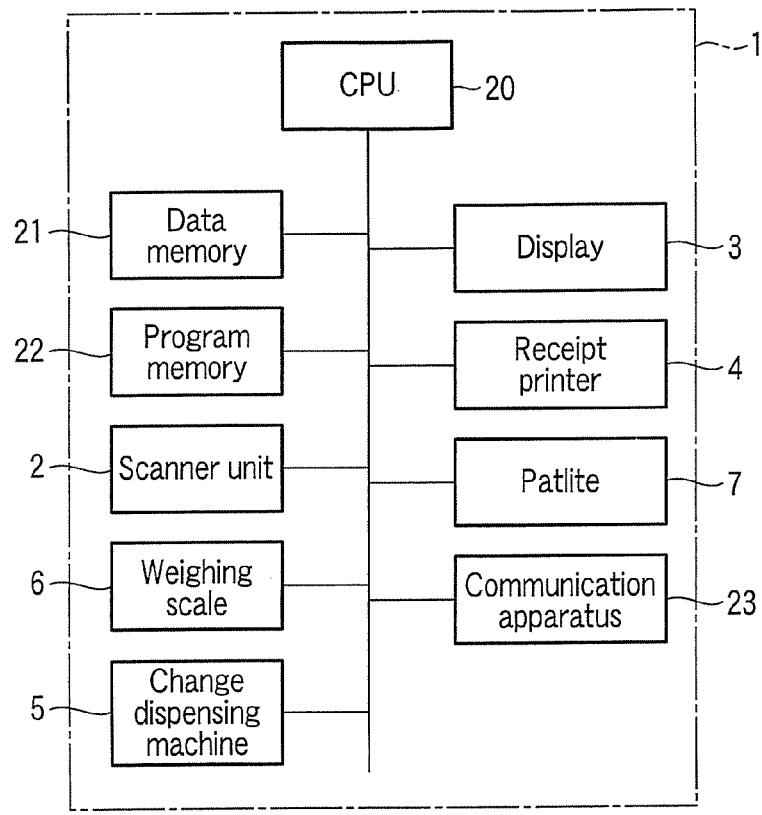
FIG. 2 is a block diagram of a main part configuration of the self-checkout terminal according to the first embodiment.

FIG. 2 is a block diagram of a main part configuration of the terminal 1. The terminal 1 is mounted with a CPU 20. The scanner unit 2, the display 3, the receipt printer 4, the change dispensing machine 5, the weighing scale 6, and the Patlite 7 are connected to the CPU 20. Further, a data memory 21, a program memory 22, and a communication apparatus 23 are connected to the CPU 20.

The data memory 21 temporarily stores, for example, data during registration and settlement processing for commodities. In the program memory 22, various control programs executed by the CPU 20 are stored in advance. The control programs include an age-limit checking program. The age-limit checking program causes the CPU 20 to realize an age-limit determining function and an age-limit checking function. The age-limit determining function is a function of determining whether a commodity has an age limit condition. The age-limit checking function is a function of checking, if the commodity has the age limit condition, before settlement processing for the commodity is performed, whether a customer satisfies the age limit condition in purchasing the commodity and, if the customer satisfies the age limit condition, shifting to the settlement processing for the commodity and, if the customer does not satisfy the age limit condition, suspending the shift to the settlement processing for the commodity. The communication apparatus 23 performs data communication between the terminal 1 and an external apparatus.

Figure 3:
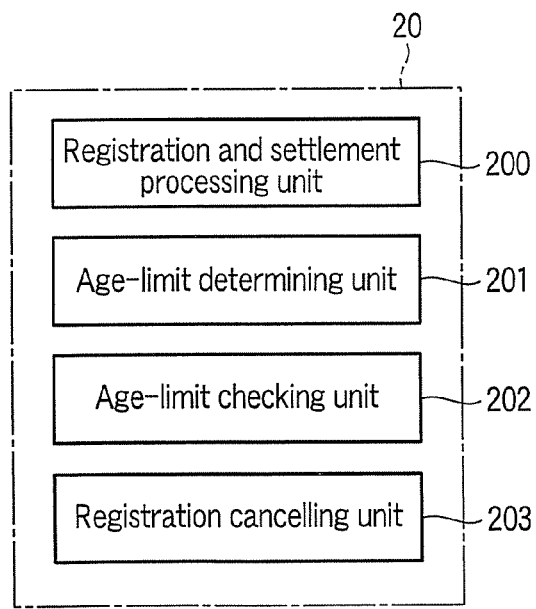
FIG. 3 is a block diagram of functions realized by a CPU of the self-checkout terminal according to the first embodiment.

The CPU 20 executes the control programs stored in the program memory 22 to realize, as shown in FIG. 3, a registration and settlement processing unit 200 (hereinafter, processing unit 200), an age-limit determining unit 201 (hereinafter, determining unit 201), an age-limit checking unit 202 (hereinafter, checking unit 202), and a registration cancelling unit 203 (hereinafter, cancelling unit 203). The determining unit 201, the checking unit 202, and the cancelling unit 203 are realized by the age-limit checking program.

The processing unit 200 functions as a registration processing unit and a settlement processing unit in this embodiment and performs registration and settlement processing for commodities. The processing unit 200 displays a registration button R and a settlement button D on the display screen of the display 3, for example, as shown in FIG. 4. The registration processing indicates, for example, processing for acquiring, on the basis of a data code read by the scanner unit 2, commodity data (a commodity name, a unit price, and age limit information, etc.) corresponding to the data code and temporarily storing the commodity data in the data memory 21 together with the data code. The registration processing is ended when the registration button R is touched. The settlement processing is started when the settlement button D is touched. The settlement processing indicates, for example, processing for deciding, on condition that the registration button R is pressed, transaction data from a commodity name, a unit price, and the like corresponding to the data code stored in the data memory 21, calculating a total amount, and print-outputting determined content of the transaction on a receipt with the receipt printer 4 after confirming payment by the change dispensing machine 5. The age limit information includes, for example, information indicating whether the commodity is a limited commodity and an age allowed to purchase the commodity when the commodity is the limited commodity.

The determining unit 201 determines, on the basis of the age limit information of the commodity data temporarily stored in the data memory 21, whether the commodity has an age limit condition.

If the commodity has the age limit condition as a result of the determination by the determining unit 201, the checking unit 202 checks, before the settlement processing for the commodity is performed, whether a customer satisfies the age limit condition in purchasing the commodity, for example, if the commodity is the limited commodity, checks whether the age of the customer about to purchase the commodity reaches an age allowed to purchase the commodity. If the customer satisfies the age limit condition, the checking unit 202 shifts to the settlement processing for the commodity and, if the customer does not satisfy the age limit condition, the checking unit 202 suspends the shift to the settlement processing for the commodity.

When the registration of the commodity ends and the settlement processing for the commodity is started, for example, when the registration button R is touched, the checking unit 202 checks whether the customer satisfies the age limit condition.

The checking unit 202 can change time for checking whether the customer satisfies the age limit condition to one of the time when the commodity data is acquired by the processing unit 200 and the time before the processing by the processing unit 200 is completed for all commodities sold in one commercial transaction and the settlement processing for the commodity is performed.

For example, the checking unit 202 displays a message "Now checking. Please wait for a while" on the screen of the display 3 as shown in FIG. 4 or emits sound of the message to notify that the checking unit 202 is checking whether the customer satisfies the age limit condition. During this notification, the checking unit 202 inactivates the settlement button D to inhibit the shift to the settlement processing for the commodity. Alternatively, the checking unit 202 may, for example, blink the Patlite 7 while checking whether the customer satisfies the age limit condition.

If the time for checking whether the customer satisfies the age limit condition is set to the time before the processing by the processing unit 200 is completed for all commodities sold in one commercial transaction and the settlement processing for the commodities is performed, when the checking unit 202 confirms once that the customer satisfies the age limit condition, the checking unit 202 permits the registration processing for all commodities that the customer is about to purchase in the commercial transaction, i.e., all commodities including the limited commodity.

When a registered commodity is a limited commodity and a customer does not satisfy an age limit condition, the cancelling unit 203 cancels the registration of the commodity. For example, the cancelling unit 203 displays a message indicating that the registration of the commodity is cancelled to notify to that effect.

In the operation of the terminal 1 in a store, as shown in FIG. 5, a plurality of, for example, a quartet of self-checkout terminals 1-1 to 1-4 are provided. The terminals 1-1 to 1-4 are connected to an attendant terminal 34 as a monitoring terminal via a hub 33. The terminals 1-1 to 1-4 are respectively set to be changed to self-registers or normal registers, which are operated by cashiers, according to an instruction from the attendant terminal 34.

The attendant terminal 34 is operated by an attendant and monitors states of self-checkouts of the terminals 1-1 to 1-4 set as the self-registers. The attendant terminal 34 sends instructions for respectively setting to change the terminals 1-1 to 1-4 to the self-registers or the normal registers. When the attendant terminal 34 receives a message for checking whether a customer satisfies an age limit condition from any one of the terminals 1-1 to 1-4, the attendant terminal 34 receives a result of the check by the attendant concerning whether the customer satisfies the age limit condition and returns the check result to any one of the terminals 1-1 to 1-4 as an originator of the message.

The operation of the terminal 1 configured as explained above is explained with reference to flowcharts of FIGS. 6 and 7.

The checking unit 202 checks whether time for checking whether a customer satisfies an age limit condition is changed (ACT 1). Usually, the time for checking an age limit condition is the time when a commodity is registered. If there is no change as a result of the determination, the scanner unit 2 reads a data code, for example, a barcode attached to a commodity (ACT 2). The processing unit 200 acquires, for example, a commodity name, a unit price, and information indicating whether the commodity is a limited commodity (age limit information) as commodity data on the basis of information read from the barcode by the scanner unit 2.

The determining unit 201 determines from the commodity data acquired by the processing unit 200 whether the commodity is the limited commodity (ACT 3). As a result of the determination, if the commodity is not the limited commodity, the processing unit 200 subjects the commodity to registration processing (ACT 4).

On the other hand, if the commodity is the limited commodity, for example, the checking unit 202 displays a message "Now checking. Please wait for a while" on the screen of the display 3 or emits sound of the message (ACT 5). The checking unit 202 blinks, for example, the Patlite 7 while checking whether a customer satisfies an age limit condition.

For example, the attendant checks the age of the customer. When the four terminals 1-1 to 1-4 are connected to the attendant terminal 34 as shown in FIG. 5, for example, the checking unit 202 of the terminal 1-1 displays a message "Now checking. Please wait for a while" on the screen of the display 3 and sends a message for an age check (data for urging the check) to the attendant terminal 34 (ACT 6).

Figure 8:
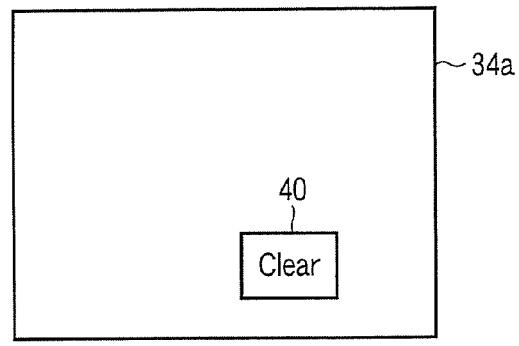
FIG. 8 is a diagram of a clear button displayed on a display of the attendant terminal in the first embodiment.

When the attendant terminal 34 receives the message for the age check, the attendant terminal 34 displays a clear button 40 on a display screen of a display 34a as shown in FIG. 8. The attendant touches the clear button 40 if the age of the customer reaches an age allowed to purchase the limited commodity as a result of the check of the age of the customer by the attendant. When the clear button 40 is touched, the attendant terminal 34 sends a message of completion of the age check (data of completion of the check) to the terminal 1-1.

After sending the message for the age check to the attendant terminal 34, the checking unit 202 determines whether the customer satisfies the age limit condition, i.e., whether the message of completion of the age check is returned from the attendant terminal 34 (ACT 7).

When the checking unit 202 receives the message of completion of the age check, the checking unit 202 determines that the customer satisfies the age limit condition (Yes in ACT 7). At this point, the checking unit 202 notifies the processing unit 200 that registration of the limited commodity is permitted. According to the notification, the processing unit 200 subjects the commodity to the registration processing (ACT 4).

Figure 9:
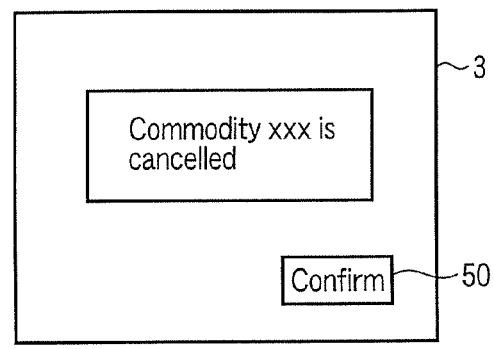
FIG. 9 is a diagram of an example of a message for notifying commodity cancellation displayed on the display of the self-checkout terminal according to the first embodiment.

If the checking unit 202 determines that the message of completion of the age check is not returned from the attendant terminal 34, i.e., if the checking unit 202 determines that the customer does not satisfy the age limit condition (No in ACT 7), the cancelling unit 203 displays a message indicating that the registration of the commodity is cancelled such as "Commodity XXX is cancelled" and a confirmation button 50 shown in FIG. 9 on the display 3 (ACT 8). "Commodity XXX" is a commodity name of the limited commodity. This message continues to be displayed until the confirmation button 50 is touched. When the confirmation button 50 is touched, the message is erased and another kind of operation such as registration of the next commodity is received. At this point, the registration processing for the limited commodity (ACT 4) is not performed.

After the commodity is subjected to the registration processing (ACT 4) or after the cancellation of the limited commodity is notified (ACT 8), if the next commodity is present, the processing returns to ACT 1 (Yes in ACT 9). On the other hand, when the registration button R is touched, the processing unit 200 determines that the registration processing for the commodity ends (No in ACT 9) and activates the settlement button D. This makes it possible to shift to settlement processing.

At this point, when the settlement button D is touched, the processing unit 200 performs the settlement processing using the commodity data of the registered commodity (ACT 10). Checkout for the customer is completed according to the settlement processing.

If the time for checking whether the customer satisfies the age limit condition is changed as a result of the determination in ACT 1, the scanner unit 2 reads a data code, for example, a barcode attached to a commodity (ACT 20). The processing unit 200 acquires, for example, a commodity name, a unit price, and information indicating whether the commodity is a limited commodity (age limit information) as commodity data on the basis of information read from the barcode by the scanner unit 2.

The determining unit 201 determines from the commodity data acquired by the processing unit 200 whether the commodity is a limited commodity (ACT 21). As a result of the determination, if the commodity is not the limited commodity, the processing unit 200 subjects the commodity to the registration processing (ACT 22).

After the commodity is subjected to the registration processing, if the next commodity is present, the processing returns to ACT 20 (Yes in ACT 23) and the scanner unit 2 performs reading of a barcode attached to the commodity. When the registration processing for all commodities ends and the registration button R is pressed, the processing unit 200 determines that the registration processing for the commodities ends (No in ACT 9) and activates the settlement button D. This makes it possible to shift to the settlement processing. At this point, when the settlement button D is touched, the processing unit 200 performs the settlement processing using commodity data of the registered commodities (ACT 24).

On the other hand, even if the commodity is the limited commodity (Yes in ACT 21), the processing unit 200 subjects the commodity to the registration processing (ACT 25). At the same time, the checking unit 202 transmits a message for an age check to the attendant terminal 34, displays a message "A commodity requiring an age check is registered." on the screen of the display 3, and permits the registration processing for the next commodity. If the next commodity is present, the scanner unit 2 reads a data code, for example, a barcode attached to the commodity (ACT 27). Thereafter, the processing unit 200 performs the registration processing for the commodity (ACT 25). Thereafter, ACTS 25 to 27 are repeated and registration of commodities including the limited commodity is sequentially performed. In other words, even if the processing unit 200 confirms registration of a limited commodity once, the processing unit 200 thereafter performs registration of all the commodities including the limited commodity in the present registration processing.

If the registration processing for all the commodities ends and it is determined that the registration button R is touched, the processing unit 200 checks whether a message of completion of the age check is received from the attendant terminal 34 (ACT 28). At this point, the processing unit 200 maintains the settlement button D inactive and inhibits shift to the settlement processing. If the message of completion of the age check is received (Yes in ACT 28), the processing unit 200 activates the settlement button D. This makes it possible to shift to the settlement processing. When the settlement button D is touched, the processing unit 200 performs the settlement processing (ACT 33). According to the settlement processing, checkout for the customer is completed.

If the message of completion of the age check is not received (No in ACT 28), for example, the checking unit 202 displays a message "Now checking. Please wait for a while" on the screen of the display 3 or emits sound of the message (ACT 29). The checking unit 202 blinks, for example, the Patlite 7 while checking whether the customer satisfies the age limit condition. In this way, at the start of the settlement processing, if a limited commodity is present among the commodities subjected to the registration processing, the settlement processing by the processing unit 200 is suspended.

After the message display or the like, the checking unit 202 transmits the message for the age check to the attendant terminal 34 again (ACT 30). The checking unit 202 determines whether the customer satisfies the age limit condition, i.e., whether the message of completion of the age check is returned from the attendant terminal 34 (ACT 31). In this way, in the flowchart of FIG. 7, after the registration processing in one commercial transaction ends, the checking unit 202 determines whether the message of completion of the age check is returned from the attendant terminal 34.

When the clear button 40 shown in FIG. 8 is touched as explained above, the attendant terminal 34 sends the message of completion of the age check to the terminal 1-1. When the checking unit 202 of the terminal 1-1 receives the message of completion of the age check, the checking unit 202 determines that the customer satisfies the age limit condition (Yes in ACT 31). At this point, the checking unit 202 notifies the processing unit 200 that registration of the limited commodity is permitted. The processing unit 200 activates the settlement button D such that the settlement processing for all the commodities including the limited commodity can be performed. This makes it possible to shift to the settlement processing. When the settlement button D is touched, the processing unit 200 performs the settlement processing (ACT 33). In this way, in the flowchart of FIG. 7, when the checking unit 202 once determines that the message of completion of the age check is returned from the attendant terminal 34, the checking unit 202 permits the settlement processing for all the commodities subjected to the registration processing in the commercial transaction. When the settlement processing is permitted by the checking unit 202, the processing unit 200 executes the settlement processing for all the commodities subjected to the registration processing in the commercial transaction.

If the checking unit 202 determines that the message of completion of the age check is not returned from the attendant terminal 34, i.e., if the checking unit 202 determines that the customer does not satisfy the age limit condition (No in ACT 31), the cancelling unit 203 cancels the limited commodity out of the registered commodities (ACT 32). Further, the cancelling unit 203 displays a message indicating that the registered limited commodity is cancelled and the confirmation button 50 as shown in FIG. 9. When plural registered limited commodities are present, names of the limited commodities are inserted in the message. When the confirmation button 50 is touched, the message is erased.

After the message is erased, the processing unit 200 activates the settlement button D and, when the settlement button D is touched, performs the settlement processing (ACT 33).

In this way, the terminal 1 according to this embodiment determines whether a commodity has an age limit condition, if the commodity has an age limit condition, before performing the settlement processing for the commodity, checks whether a customer who purchases the commodity satisfies the age limit condition, if the customer satisfies the age limit condition, shifts to the settlement processing for the commodity, and, if the customer does not satisfy the age limit condition, suspends the shift to the settlement processing for the commodity. With such a configuration, even if a limited commodity is present, it is possible to continue the registration processing for all commodities including the limited commodity.

Therefore, even if the attendant has to leave the attendant terminal 34 and is temporarily absent at the attendant terminal 34, it is possible to end the registration processing for all the commodities during the absence. When a limited commodity is present during the registration processing for commodities and a cashier attempts to check with the attendant about the age of a customer, it is possible to prevent a situation in which the attendant is absent and the customer is kept waiting and annoyed. The attendant leaves the attendant terminal 34 only temporarily because of a job. If the attendant returns to the attendant terminal 34 by the time when the registration processing for all the commodities ends, it is possible to carry forward the registration and settlement processing for the commodities without an interruption. As a result, time in which the attendant is absent and the customer is kept waiting can be more substantially reduced by a method of checking, before performing the settlement processing for commodities, whether the customer satisfies an age limit condition as in this embodiment than by a method of checking, in every registration processing for a commodity, whether the customer satisfies the age limit condition.

Second Embodiment

A second embodiment is explained below.

In this embodiment, means for causing a customer herself or himself to complete an age check is added to the configuration disclosed in the first embodiment. Components same as those in the first embodiment are denoted by the same reference numerals and signs and explanation of the components is omitted.

Figure 10:
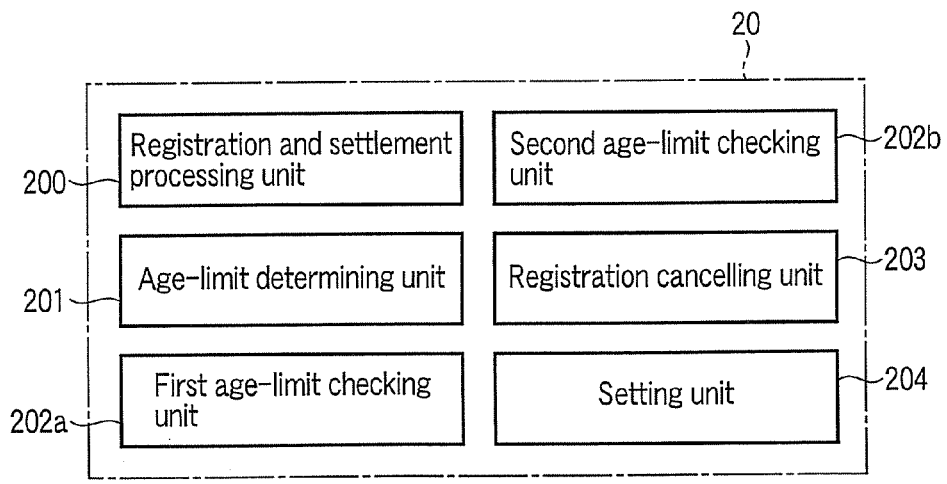
FIG. 10 is a block diagram of functions realized by a CPU of a self-checkout terminal according to a second embodiment.

The CPU 20 in this embodiment executes the control programs stored in the program memory 22 to realize, as shown in FIG. 10, the registration and settlement processing unit 200 (hereinafter, processing unit 200), the age-limit determining unit 201 (hereinafter, determining unit 201), a first age-limit checking unit 202*a* (hereinafter, first checking unit 202*a*), a second age-limit checking unit 202*b* (hereinafter, second checking unit 202*b*), the registration cancelling unit 203 (hereinafter, cancelling unit 203), and a setting unit 204. The processing unit 200, the determining unit 201, and the cancelling unit 203 have functions basically the same as those in the first embodiment. The first checking unit 202*a* has a function basically the same as that of the checking unit 202 in the first embodiment.

If a commodity has an age limit condition as a result of determination by the determining unit 201, the second checking unit 202*b* checks with a customer as an operator of the terminal 1, according to touch operation on the display 3, whether the age of the customer reaches an age allowed to purchase the commodity. The display 3 functions as an operation unit in this embodiment.

The setting unit 204 sets processing by one of the first checking unit 202*a* and the second checking unit 202*b* to be valid.

If the processing by the first checking unit 202*a* is set to be valid, when the determining unit 201 determines that the commodity is subjected to sales limitation, the processing unit 200 inhibits shift to the settlement processing for the commodity. When the processing unit 200 receives a message of completion of the age check from the attendant terminal 34, the processing unit 200 enables the shift to the settlement processing for the commodity and executes the settlement processing on the basis of price information of the commodity. If the processing by the second checking unit 202*b* is set to be valid, when the determining unit 201 determines that the commodity is subjected to sales limitation, the processing unit 200 inhibits the shift to the settlement processing for the commodity. When the second checking unit 202*b* confirms that the age of the customer reaches the age allowed to purchase the commodity, the processing unit 200 enables the shift to the settlement processing for the commodity and executes the settlement processing on the basis of the price information of the commodity.

Figure 6:
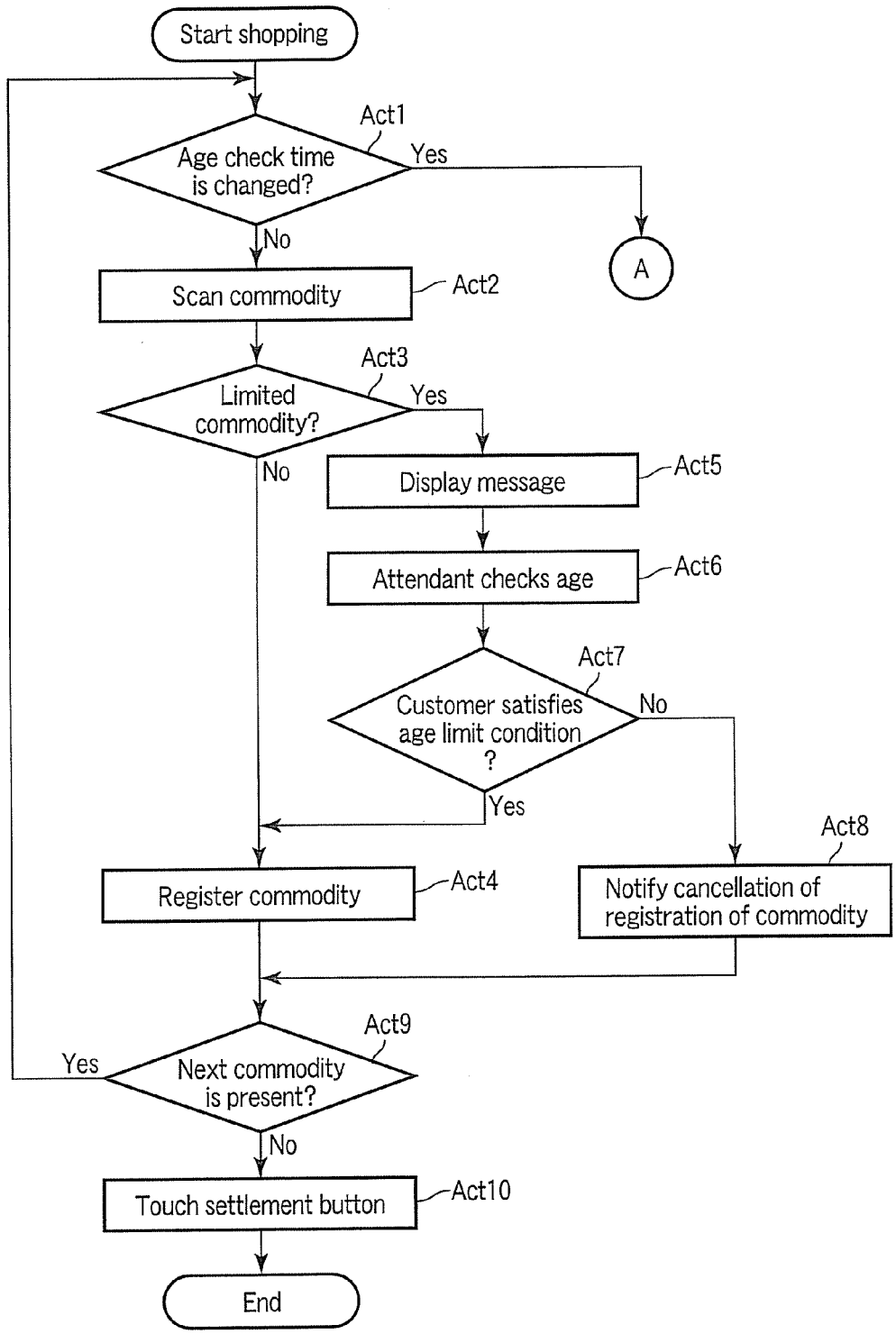
FIG. 6 is a flowchart for explaining the operation of the self-checkout terminal according to the first embodiment.
Figure 7:
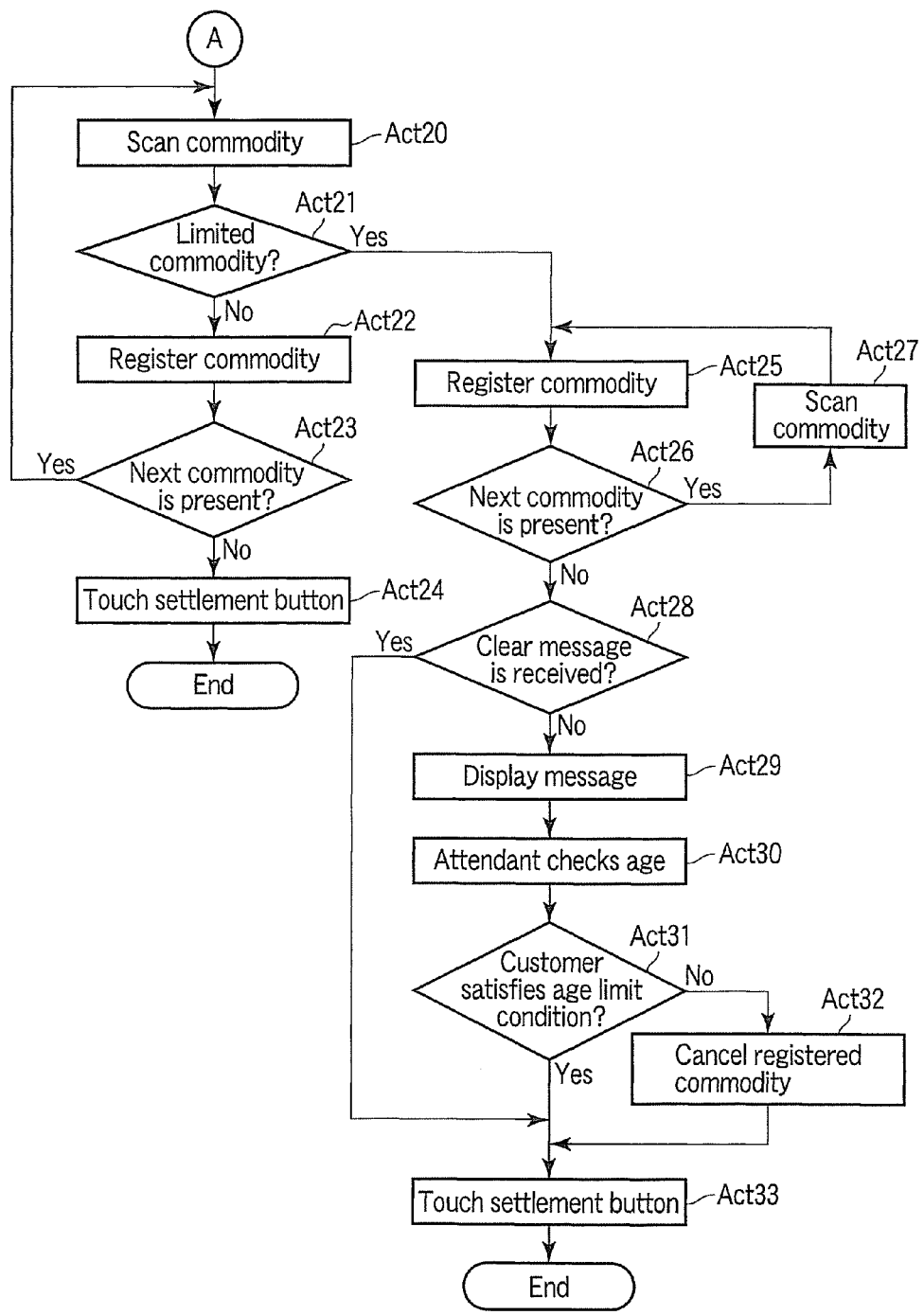
FIG. 7 is a flowchart for explaining the operation of the self-checkout terminal according to the first embodiment.

In this embodiment, the CPU 20 operates according to a flow basically the same as the flowcharts of FIGS. 6 and 7. However, in this embodiment, when an attendant leaves a setting place of the attendant terminal 34, the attendant operates an operation unit such as a keyboard of the attendant terminal 34 and transmits attendant absence notification to the self-checkout terminals 1. When the notification is received, the setting unit 204 sets the processing by the second checking unit 202*b* to be valid.

If the processing by the second checking unit 202*b* is set to be valid by the setting unit 204, in ACTS 7 and 31, the second checking unit 202*b* starts processing for causing a customer herself or himself to complete an age check.

Figure 11:
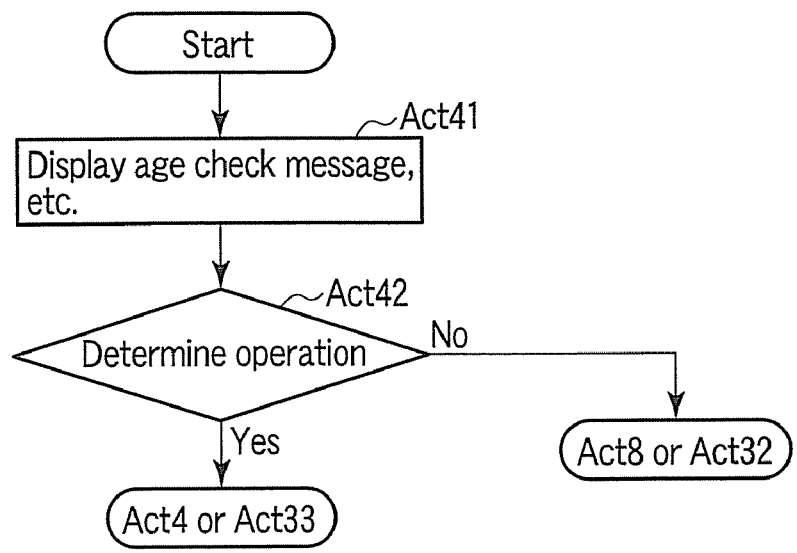
FIG. 11 is a flowchart for explaining the operation of the self-checkout terminal according to the second embodiment.
Figure 12:
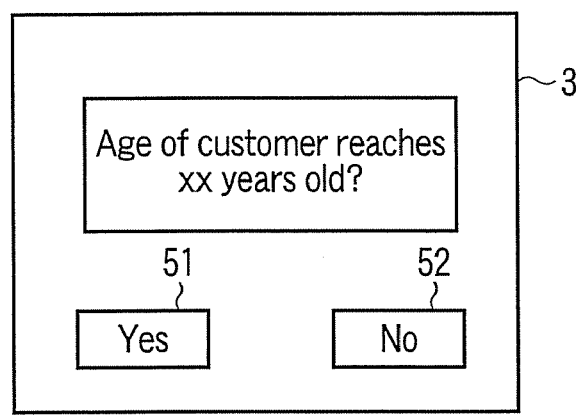
FIG. 12 is a diagram of an example of an age check message displayed on a display of the self-checkout terminal according to the second embodiment.

A flowchart of this processing is shown in FIG. 11. In the beginning of the start of the processing, the second checking unit 202*b* displays a message for asking whether the age of the customer reaches a limit age such as "The age of the customer reaches XX years old?", a YES button 51, and a NO button 52 shown in FIG. 12 on the display 3 (ACT 41). The YES button 51 is a button for inputting indication that the age of the customer reaches the limit age (a condition for sales limitation is satisfied). The NO button 52 is a button for inputting indication that the age of the customer does not reach the limit age (the condition for sales limitation is not satisfied). When the message and the buttons 51 and 52 are displayed, since the settlement button D is erased from the display 3, the shift to the settlement processing is inhibited. "XX years old" in the message is a boundary value of an age allowed to purchase the limited commodity as a check target. If this processing is started in ACT 41 and plural registered limited commodities are present, "XX years old" only has to be set to a minimum value among boundary values of ages allowed to purchase the limited commodities.

After ACT 41, the second checking unit 202*b* waits for the buttons 51 and 52 to be touched. When one of the buttons is touched, the second checking unit 202*b* determines the type of the button (ACT 42).

If the touched button is the YES button 51 (Yes in ACT 42), the second checking unit 202*b* determines that the customer satisfies the age limit condition, erases the message and the like from the display 3, and displays the registration button R and the settlement button D. At this point, if the processing of this flowchart is started in ACT 7, the second checking unit 202*b* notifies the processing unit 200 that registration of the limited commodity is permitted. The processing unit 200 subjects the commodity to the registration processing (ACT 4). After the commodity is subjected to the registration processing (ACT 4), if the next commodity is present, the processing returns to ACT 1 (Yes in ACT 9). On the other hand, if the processing of this flowchart is started in ACT 31, the second checking unit 202*b* notifies the processing unit 200 that the registration of the limited commodity is permitted. The processing unit 200 activates the settlement button D such that the settlement processing for all the commodities including the limited commodity can be performed. This makes it possible to shift to the settlement processing. When the settlement button D is touched, the processing unit 200 performs the settlement processing (ACT 33).

If the touched button is the NO button 52 (No in ACT 42), the second checking unit 202*b* determines that the customer does not satisfy the age limit condition. At this point, if the processing of this flowchart is started in ACT 7, the cancelling unit 203 displays a message indicating that the registration of the commodity is cancelled such as "Commodity XXX is cancelled" and the confirmation button 50 shown in FIG. 9 on the display 3 (ACT 8). The registration processing for the limited commodity (ACT 4) is not performed. After the confirmation button 50 is touched and the message is erased, if the next commodity is present, the processing returns to ACT 1 (Yes in ACT 9). On the other hand, if the processing of this flowchart is started in ACT 31, the cancelling unit 203 cancels the limited commodity out of the registered commodities (ACT 32). Further, the cancelling unit 203 displays the message indicating that the registered limited commodity is cancelled and the confirmation button 50 as shown in FIG. 9. After the confirmation button 50 is touched and the message is erased, the processing unit 200 displays the registration button R and the settlement button D on the display 3 and activates the settlement button D. This makes it possible to shift to the settlement processing. When the settlement button D is touched, the processing unit 200 performs the settlement processing (ACT 33).

When the attendant returns to the setting place of the attendant terminal 34, the attendant operates the operation unit of the attendant terminal 34 and transmits attendant presence notification to the terminals 1. When the notification is received, the setting unit 204 sets the processing by the first checking unit 202*a* to be valid. In this case, the processing shown in the flowchart of FIG. 11 is not performed in ACTS 7 and 31. Processing same as that in the first embodiment is executed by the first checking unit 202*a*.

In this way, according to this embodiment, even when the attendant is absent at the setting place of the attendant terminal 34, it is possible to cause a customer herself or himself to complete an age check and purchase a limited commodity. With such a configuration, even when the attendant has to leave the setting place of the attendant terminal 34, the registration processing and the settlement processing of the limited commodity performed during the absence of the attendant are not delayed.

Modifications

In the embodiments, the attendant present at the attendant terminal 34 performs a check of the age of a customer. However, the present invention is not limited to this. Cashers present at the terminals 1-1 to 1-4 may perform the check. In this case, the clear button 40 is displayed on the display screen of the display 3 of each of the terminals 1-1 to 1-4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A self-checkout terminal comprising:
an operation unit;
a reading unit configured to read a data code attached to a commodity;
a registration processing unit configured to acquire, based on the data code, at least price information and sales limitation information of the commodity;
a limitation determining unit configured to determine, according to the sales limitation information acquired by the registration processing unit, whether the commodity is subjected to sales limitation;
a first checking unit configured to transmit, if the limitation determining unit determines that the commodity is subjected to the sales limitation, first data for urging a check concerning whether a condition for the sales limitation is satisfied to a monitoring terminal and determine whether second data indicating completion of the check is returned from the monitoring terminal;
a second checking unit configured to determine, if the limitation determining unit determines that the commodity is subjected to the sales limitation, whether indication that the condition for the sales limitation is satisfied is input by the operation unit;
a setting unit configured to set processing by the second checking unit to be valid in response to receiving attendant absence notification from the monitoring terminal, and set processing by the first checking unit to be valid in response to receiving attendant presence notification from the monitoring terminal; and
a settlement processing unit configured to inhibit, if the limitation determining unit determines that the commodity is subjected to the sales limitation, shift to settlement processing for the commodity and, if the processing by the first checking unit is set to be valid, enable, if the first checking unit determines that the second data indicating the completion of the check is received from the monitoring terminal, the shift to the settlement processing for the commodity and execute the settlement processing based on the price information of the commodity, and, if the processing by the second checking unit is set to be valid, enable, if indication that the condition for the sales limitation is satisfied is input by the operation unit, the shift to the settlement processing for the commodity and execute the settlement processing based on the price information of the commodity.

2. The terminal according to claim 1, wherein the first checking unit is further configured to determine, after processing by the registration processing unit in one commercial transaction ends, whether the second data indicating the completion of the check is returned from the monitoring terminal.

3. The terminal according to claim 1, wherein the first checking unit is further configured to change time for determining whether the second data indicating the completion of the check is returned from the monitoring terminal to one of time when the price information and the sales limitation information are acquired by the registration processing unit or time when processing by the registration processing unit is completed for all commodities sold in one commercial transaction.

4. The terminal according to claim 1, wherein the first checking unit is further configured to notify, while waiting for the second data indicating the completion of the check returned from the monitoring terminal, that the first checking unit is checking whether the condition for the sales limitation is satisfied.

5. The terminal according to claim 1, further comprising a display with touch panel configured to display a button for instructing execution of the settlement processing by the settlement processing unit, wherein
the settlement processing unit is further configured to inhibit, while the first checking unit waits for the second data indicating the completion of the check returned from the monitoring terminal, shift to the settlement processing for the commodity by inactivating the button, and enables, if the first checking unit receives the second data indicating the completion of the check, the shift to the settlement processing by activating the button and executes the settlement processing according to a touch on the button.

6. The terminal according to claim 1 wherein
the first checking unit is further configured to permit, in response to determining that the second data indicating the completion of the check is returned from the monitoring terminal, the settlement processing for all commodities subjected to the registration processing in a commercial transaction; and
the settlement processing unit is further configured to execute, if the first checking unit permits the settlement processing, the settlement processing for all the commodities subjected to the registration processing in the commercial transaction.

7. The terminal according to claim 1, further comprising a cancelling unit configured to cancel, if the first checking unit determines that the second data indicating the completion of the check is not returned from the monitoring terminal, sales of the commodity subjected to the sales limitation.

8. The terminal according to. claim 1, wherein the first checking unit is further configured to transmit, in response to the limitation determining unit determining that the commodity is subjected to the sales limitation, the first data for urging the check to the monitoring terminal and, after processing by the registration processing unit is completed for all commodities sold in one commercial transaction, re-transmit, in response to determining that the second data indicating the completion of the check is not returned from the monitoring terminal, the first data for urging the check to the monitoring terminal again.

9. A method for a self-checkout terminal that subjects a commodity to sales processing according to operation of a customer, the method comprising:
- acquiring, based on an input data code, at least price information and sales limitation information of a commodity attached with a data code;
- determining, according to the sales limitation information, whether the commodity is subjected to sales limitation;
- determining, in response to determining that the commodity is subjected to the sales limitation, whether a status of a monitoring terminal indicates an attendant absence or an attendant presence;
- transmitting, in response to determining that the commodity is subjected to the sales limitation and the status of the monitoring terminal indicates the attendant presence, first data for urging a check concerning whether a condition for the sales limitation is satisfied to the monitoring terminal and determining whether second data indicating completion of the check is returned from the monitoring terminal;
- determining, in response to determining that the commodity is subjected to the sales limitation and the status of the monitoring terminal indicates the attendant absence, whether an indication that the condition for the sales limitation is satisfied is received at an operation unit of the self-checkout terminal;
- inhibiting, in response to determining that the commodity is subjected to the sales limitation, shift to settlement processing for the commodity;
- if the status of the monitoring terminal indicates the attendant presence, enabling the shift to settlement processing for the commodity in response to receipt of the second data indicating completion of the check from the monitoring terminal and executing the settlement processing based the price information of the commodity; and
- if the status of the monitoring terminal indicates the attendant absence, enabling the shift to settlement processing for the commodity in response to receipt of the indication that the condition for the sales limitation is satisfied from the operation unit of the self-checkout terminal and executing the settlement processing based on the price information of the commodity.

\* \* \* \* \*